(12) United States Patent
Zhang (10) Patent No.: US 10,787,152 B1
(45) Date of Patent: Sep. 29, 2020

(54) SYSTEMS AND METHODS FOR RENTAL VEHICLE DRIVER VERIFICATION

(71) Applicant: HONDA MOTOR CO., LTD., Tokyo (JP)

(72) Inventor: Junlei Zhang, Long Beach, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/539,740

(22) Filed: Aug. 13, 2019

(51) Int. Cl.
*B60R 25/25* (2013.01)
*G06K 9/00* (2006.01)
*G06Q 30/06* (2012.01)

(52) U.S. Cl.
CPC .......... *B60R 25/25* (2013.01); *G06K 9/00288* (2013.01); *G06Q 30/0645* (2013.01)

(58) Field of Classification Search
CPC . B60R 25/25; G06Q 30/0645; G06K 9/00288
See application file for complete search history.

(56) References Cited

U.S. PATENT DOCUMENTS

| | | | |
|---|---|---|---|
| 7,116,803 B2 | 10/2006 | Lemelson et al. | |
| 7,286,825 B2 | 10/2007 | Shishido et al. | |
| 7,369,685 B2 | 5/2008 | Delean | |
| 7,812,712 B2 | 10/2010 | White et al. | |
| 8,344,849 B2 | 1/2013 | Larsson et al. | |
| 10,297,097 B2 | 5/2019 | Mottla et al. | |
| 2008/0252412 A1* | 10/2008 | Larsson | B60R 25/252 340/5.2 |
| 2010/0108425 A1 | 5/2010 | Crespo et al. | |
| 2012/0330696 A1 | 12/2012 | Clark et al. | |
| 2013/0321178 A1 | 12/2013 | Jameel et al. | |
| 2013/0325521 A1 | 12/2013 | Jameel et al. | |
| 2014/0266594 A1* | 9/2014 | Reiser | G06F 3/04842 340/5.72 |
| 2014/0309813 A1 | 10/2014 | Ricci | |
| 2016/0046300 A1* | 2/2016 | Wingfield | G01C 21/3438 701/48 |
| 2019/0299932 A1* | 10/2019 | Porteret | G06K 9/00979 |
| 2020/0027291 A1* | 1/2020 | Mizuno | G07C 5/02 |

FOREIGN PATENT DOCUMENTS

| | | |
|---|---|---|
| CN | 105868834 A | 8/2016 |
| CN | 109493163 A | 3/2019 |

* cited by examiner

*Primary Examiner* — Nabil H Syed
(74) *Attorney, Agent, or Firm* — Arent Fox LLP (57) ABSTRACT

Disclosed are systems, methods, and computer-readable mediums for rental vehicle driver verification. In an example, a system may include a camera configured to capture an image of a user in a vehicle. The system may obtain, from a vehicle rental system, vehicle rental information corresponding to the vehicle, the vehicle rental information including rental reservations scheduled for the vehicle. The system may also determine whether the user is a designated driver of the vehicle based on the image of the user and the vehicle rental information. The system may also indicate to the user that the vehicle is an incorrect rental vehicle in response to determining that the user is not the designated driver.

14 Claims, 5 Drawing Sheets

SYSTEMS AND METHODS FOR RENTAL VEHICLE DRIVER VERIFICATION

TECHNICAL FIELD

The present disclosure relates to systems and methods for rental vehicle driver verification.

BACKGROUND

After a vehicle rental facility has verified user information, sometimes an incorrect vehicle is still selected from a vehicle rental garage by a user. For example, vehicle rental facilities typically require a user to provide user verification information to a service agent at the time of rental. Once verified, the user may receive keys to the rental vehicle but may then be required to go to the vehicle rental garage to select the rental vehicle. Due to a large number of rental vehicles and/or a number of similar looking rental vehicles, the user may accidentally select the wrong rental vehicle. However, the user typically does not know that the wrong vehicle has been selected until final check-out is performed by a service agent when the user is exiting the vehicle rental garage with the incorrect rental vehicle.

Accordingly, there is a need in the art for improved systems and methods for rental vehicle driver verification.

SUMMARY

The following presents a summary of one or more aspects of the disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the disclosure in a simplified form as a prelude to the more detailed description that is presented later.

In an aspect, the present disclosure presents a vehicle configured for rental vehicle driver verification. The vehicle may include a camera configured to capture an image of a user in the vehicle. The vehicle may also include a memory storing instructions. The vehicle may also include a processor coupled with the camera and the memory and configured to execute the instructions. The processor may receive the image of the user from the camera. The processor may also obtain, from a vehicle rental system, vehicle rental information corresponding to the vehicle, the vehicle rental information including rental reservations scheduled for the vehicle. The processor may also determine whether the user is a designated driver of the vehicle based on the image of the user and the vehicle rental information. The processor may also indicate to the user that the vehicle is an incorrect rental vehicle in response to determining that the user is not the designated driver.

In an aspect, a method for rental vehicle driver verification by a vehicle is presented. The method may include capturing an image of a user in the vehicle. The method may also include obtaining, from a vehicle rental system, vehicle rental information corresponding to the vehicle, the vehicle rental information including rental reservations scheduled for the vehicle. The method may also include determining whether the user is a designated driver of the vehicle based on the image of the user and the vehicle rental information. The method may also include indicating to the user that the vehicle is an incorrect rental vehicle in response to determining that the user is not the designated driver.

In an aspect, a computer-readable medium storing executable code for rental vehicle driver verification of a vehicle, is presented. The computer-readable medium may include code to capture an image of a user in the vehicle. The computer-readable medium may also include code to obtain, from a vehicle rental system, vehicle rental information corresponding to the vehicle, the vehicle rental information including rental reservations scheduled for the vehicle. The computer-readable medium may also include code to determine whether the user is a designated driver of the vehicle based on the image of the user and the vehicle rental information. The computer-readable medium may also include code to indicate to the user that the vehicle is an incorrect rental vehicle in response to determining that the user is not the designated driver.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative implementations when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

The term "bus," as used herein, may refer to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area Network (CAN), Local Interconnect Network (LIN), among others.

The term "vehicle," as used herein, may refer to any mechanically moving object that is capable of transporting one or more human occupants. The term "vehicle" may include, but is not limited to: cars, trucks, vans, minivans, SUVs, motorcycles, scooters, boats, personal watercrafts, or aircrafts.

The term "memory," as used herein, may include volatile memory and/or nonvolatile memory. Non-volatile memory may include ROM (read only memory), PROM (programmable read only memory), EPROM (erasable PROM) and EEPROM (electrically erasable PROM). Volatile memory may include RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, may include a connection by which entities are "operably connected", is one in which signals, physical communications, and/or logical communications may be sent and/or received. An operable connection may include a physical interface, a data interface, and/or an electrical interface.

The term "processor," as used herein, may refer to a device that processes signals and performs general computing and arithmetic functions. Signals processed by the processor may include digital signals, data signals, computer instructions, processor instructions, messages, a bit, a bit stream, or other computing that may be received, transmitted and/or detected. A processor may include microprocessors, microcontrollers, digital signal processors (DSPs), field programmable gate arrays (FPGAs), programmable logic devices (PLDs), state machines, gated logic, discrete hardware circuits, or other suitable hardware configured to perform the various functionality described herein.

The term "vehicle system," as used herein, may refer to an electronically controlled system on a vehicle operable to perform certain actions on components of the vehicle, which may provide an interface to allow operation by another system or graphical user interaction. The vehicle system may include, but are not limited to, vehicle ignition systems, vehicle conditioning systems (e.g., systems that operate a windshield wiper motor, a windshield washer fluid motor or pump, a defroster motor, heating, ventilating, or air conditioning (HVAC) controls), vehicle audio systems, vehicle security systems, vehicle video systems, vehicle infotainment systems, vehicle telephone systems, and/or the like.

The term "vehicle applications" or "applications," as used herein, may refer to any software run by the vehicle system, which may provide information or data to a user of the vehicle, or may receive information or data from a user of a vehicle. The vehicle applications may be displayed on the screen and may include, but are not limited to, navigation, radio, telephone, settings, electric charging, status information, cameras, web browsers, e-mail, games, utilities, and/or the like.

The term "graphical user interface," "GUI," or "user interface," as used herein, may refer to a type of interface that allows users to interact with electronic devices, the vehicle system, the vehicle, vehicle applications or the like, through graphical icons, visual indicators such as secondary notation, text-based, type command labels, text navigation, and/or the like.

The term "screen," "display screen," or "display," as used herein, may refer to a surface area upon which text, graphics and video are temporarily made to appear for human viewing. These may include, but are not limited to, eidophor, electroluminescent display ("ELD"), electronic paper, e-Ink, gyricon, light emitting diode display ("LED"), cathode ray tube ("CRT"), liquid-crystal display ("LCD"), plasma display panel ("PDP"), digital light processing ("DLP"), and/or the like.

The term "communications device," as used herein, may refer to a device that facilitates intercommunication among vehicle systems, communication with the vehicle systems via one or more other systems or devices, etc. In an example, communication device may interface with other systems, such as a remote device (e.g., mobile device), other computers, etc., via a wireless communication technology, such as a cellular technology, Bluetooth, etc. using a corresponding modem or transceiver.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

The present disclosure provides systems and methods for rental vehicle verification. In an example, a user may provide reservation information, such as a selected rental vehicle, user profile information, including a name, address, driver's license information, and image of the user, and billing information to a vehicle rental system for rental of the selected rental vehicle.

When picking up the rental vehicle from the vehicle rental garage (or parking lot), the user may have access to a number of rental vehicles. The user may access a first vehicle having an in-vehicle camera. The in-vehicle camera may capture an image of a face of the user and the first vehicle may compare the face (and/or profile information) of the user with a vehicle rental database to determine whether the user is a designated driver of the first vehicle. If the rental database does not include rental information corresponding to the first vehicle, or the image of the user's face does not match an image of a designated driver of the first vehicle (e.g., from a driver's license photograph or other image), the first vehicle may indicate to the user that the first vehicle is an incorrect rental vehicle. In some examples, the first vehicle may provide the indication by failing to start up, displaying on a display (e.g., head-up unit on the vehicle) a location (e.g., message or map of parking location) of a correct rental vehicle (i.e., second vehicle), or providing instructions for the correct rental vehicle to identify (e.g., by honking horn or flashing lights) itself as the correct rental vehicle.

Use of the systems and methods for rental vehicle driver verification may provide a prompt check out process for a user and prevent any confusion during the rental process.

Figure 1:
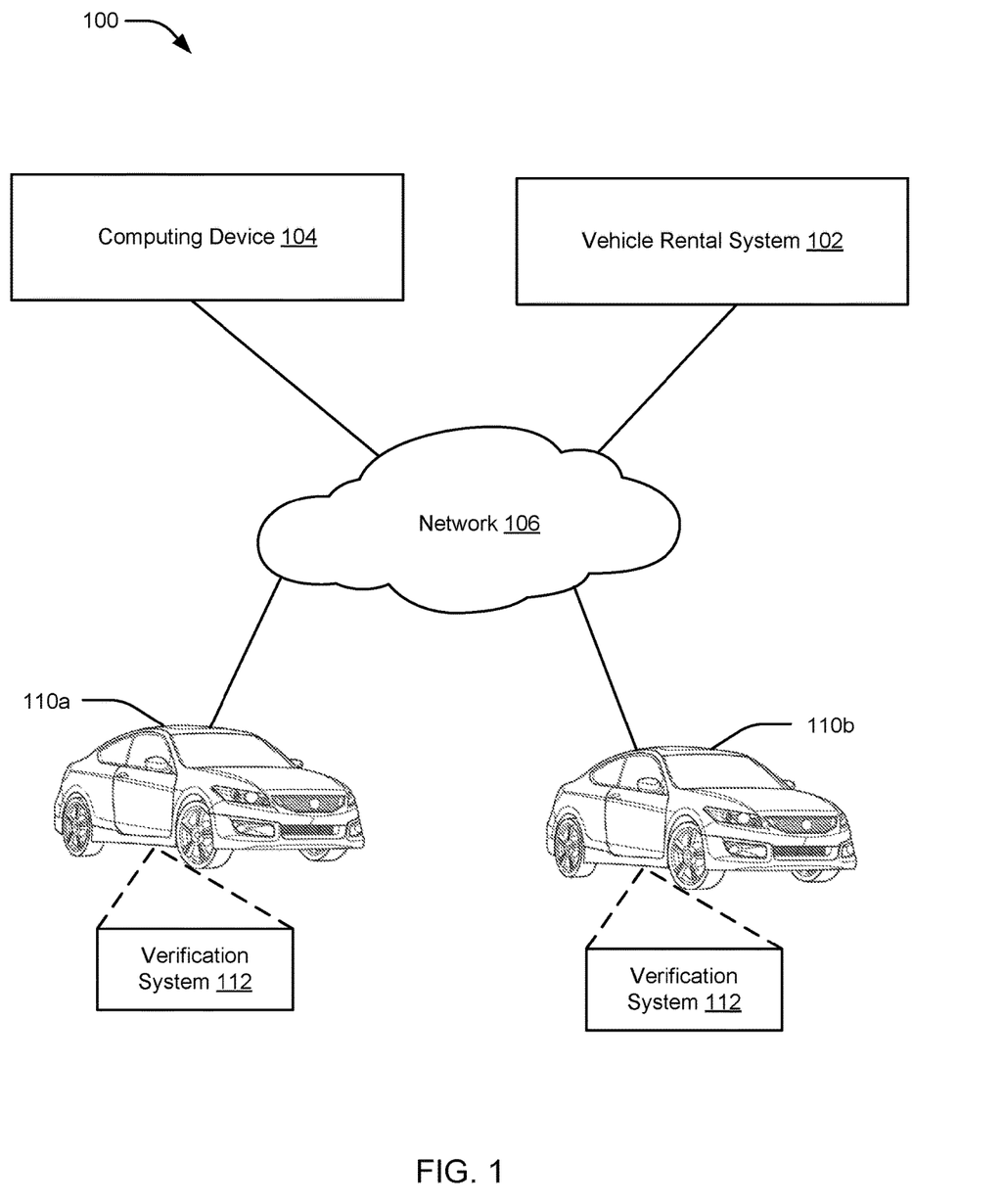
FIG. 1 illustrates a conceptual view of an example of a system for rental vehicle driver verification, according to aspects of the disclosure.

Referring to FIG. 1, a conceptual view of an example system 100 for rental vehicle driver verification, is depicted. In an aspect, the system 100 may include a vehicle rental system 102 that is communicatively coupled with a computing device 104 and verification systems 112 of a plurality of rental vehicles 110 (including first rental vehicle 110a and second rental vehicle 110b) via a network 106, such as the Internet or an intranet.

In an aspect, the vehicle rental system 102 may be configured to store and process vehicle rental information, such as reservation information, user profile information, rental vehicle availability, locations of available rental vehicles at vehicle rental garages, maps of the vehicle rental garages, and/or other vehicle rental logistics. The vehicle rental system 102 may store and process the vehicle rental information for a single vehicle rental location, a plurality of vehicle rental locations, or a centralized rental system for one or more vehicle rental locations. Accordingly, the vehicle rental system 102 may be located at a vehicle rental location or remote to the vehicle rental location. In an example, the vehicle rental system 102 may be configured to receive and transmit some of the rental information to/from the computing device 104 or one or more of the verification systems 112. Examples of the vehicle rental system 102 may include a PC, minicomputer, mainframe computer, microcomputer, or other devices having a processor and a repository for data and/or connection to a repository for data, examples of which are shown and described in more detail below in reference to FIG. 4.

In an aspect, the computing device 104 may be configured to provide a user interface for a user to access the vehicle rental system 102 to reserve one or more of the rental vehicles 110a or 110b. In an example, the computing device 104 may access a website or a server of the vehicle rental system 102 via one or more of a browser or a corresponding vehicle rental application stored on the computing device 104. When accessing the vehicle rental system 102, a user may view vehicle rental availability and estimated cost to rent a rental vehicle. The user may provide input, via the computing device 104, to reserve one or more of the rental vehicles 110a or 110b. The input may include the reservation information, such as a selected rental vehicle or information on a selected category (e.g., compact, economy, full-size, sport utility vehicle) of rental vehicles, the user profile information, and billing information. Examples of the computing device 104 may include a mobile telephone, PC, minicomputer, tablet, or any other device having a processor and capabilities to connect to the vehicle rental system 102, examples of which are shown and described in more detail below in reference to FIG. 4.

In an aspect, the first rental vehicle 110a include verification system 112. The verification system 112 may be configured to verify a user (or driver) in the first rental vehicle 110a. In an example, the verification system 112 may include a camera to capture an image of the user. The verification system 112 may be configured to obtain, from the vehicle rental system 102, vehicle rental information corresponding to the first rental vehicle 110a including rental reservations scheduled for the first rental vehicle 110a. The verification system 112 may also be configured to determine whether the user is a designated driver of the first rental vehicle 110a based on the image of the user and the vehicle rental information. The verification system 112 may be configured to indicate to the user that the first rental vehicle 110a is an incorrect rental vehicle in response to determining that the user is not the designated driver. In some examples, the verification system 112 may determine that the second rental vehicle 110b is a correct rental vehicle based on the image of the user and the vehicle rental information. In some examples, the verification system 112 may also transmit instructions to the second rental vehicle 110b to identify itself as the correct rental vehicle by, for example, honking its own horn or flashing one or more lights so the user can find the second rental vehicle 110b. In some examples, the verification system 112 of the second vehicle 110b may also receive instructions to identify itself as a correct rental vehicle.

In an aspect, the second rental vehicle 110b may also include the verification system 112 and therefore perform the same features as the first rental vehicle 110a.

Connections between the vehicle rental system 102, the computing device 104, and the plurality of rental vehicles 110 via the network 106 may be one or more of a wired connection, a wireless connection, or a fiberoptics connection, among other types of connections.

Further implementations of the verification system 112 for rental vehicle driver verification are described below in reference to FIGS. 2-5.

Figure 2:
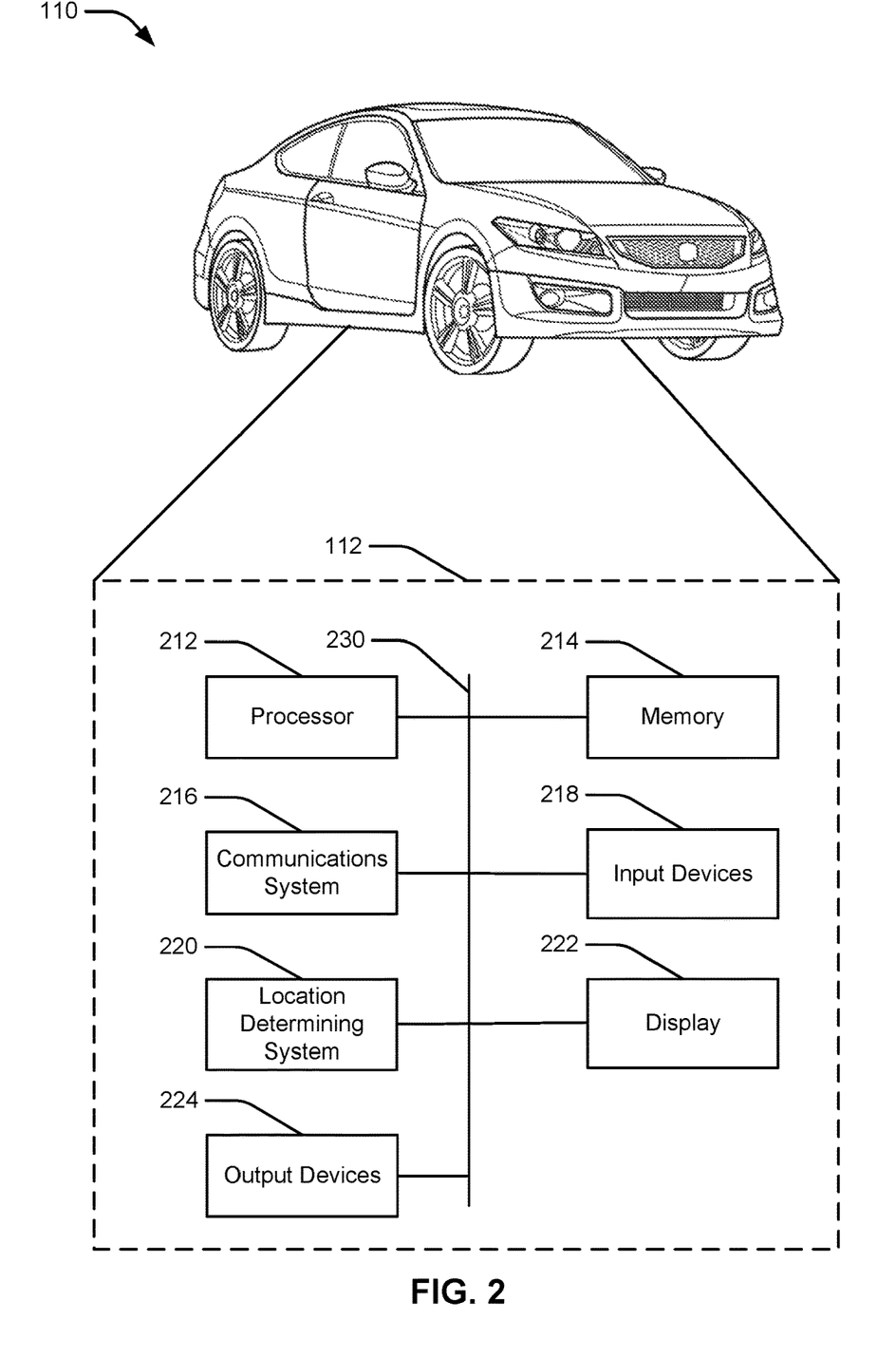
FIG. 2 illustrates a schematic view of an example operating environment for rental vehicle driver verification, according to aspects of the disclosure.

FIG. 2 shows a schematic view of an example of an operating environment of the verification system 112. The verification system 112 may at least partially reside in and/or be implemented by each of the plurality of rental vehicles 110a, 110b. The following examples will describe the verification system 112 as applied to the first rental vehicle 110a. However, these examples may apply to the second rental vehicle 110b as well. Components of the verification system 112, as well as the components of other systems, hardware architectures and software architectures discussed herein, may be combined, omitted or organized into different architectures for various aspects of the disclosure. However, the example aspects and configurations discussed herein focus on the operating environment as illustrated in FIG. 2, with corresponding system components.

The verification system 112 may include or be operably coupled with (or executed by) one or more processors 212 and memory 214 that communicate to effectuate certain functions or actions, as described herein. The one or more processors 212 may be configured to execute instructions or code stored on the memory 214. In an implementation, the instructions or code may include instructions or code for rental vehicle driver verification, as described herein.

The verification system 112 may additionally include or be operably coupled with a communications system 216, which may include substantially any wired or wireless device, related modem, etc., for providing wired or wireless communications utilizing various protocols to send/receive electronic signals internally to features and systems within the first rental vehicle 110a and/or to external devices including the vehicle rental system 102 and/or the second rental vehicle 110b (or another rental vehicle). In an example, the communications system 216 may communicate using one or more radio technologies (e.g., 3GPP radio access technologies, IEEE 802.11, Bluetooth®, etc.).

The verification system 112 may additionally include one or more input devices 218 including a camera configured to capture images of a user in the driver's seat of the rental vehicle 110a. The camera may share the images with the one or more processors 212 and/or the memory 214.

The verification system 112 may additionally or optionally include or be operably coupled with a location determining system 220 for determining a location/position of the first rental vehicle 110a at a vehicle rental garage. For example, the location determining system 220 may determine one or more location-related parameters, such as a parking location or position of the first rental vehicle 110a at the vehicle rental garage. In some examples, the location determining system 220 may include or may be operably coupled with a global positioning system ("GPS") device (or other latitude/longitude determination device), an indoor positioning system ("IPS"), a speedometer, an accelerometer, a gyroscope, and/or the like, to determine the location-related parameters. In some examples, the location determining system 220 may receive the location-related parameters from the vehicle rental system 102 based on vehicle tracking information, indoor parking systems at the vehicle rental garage, or input information from a rental agent.

The location determining system 220 may also determine a location/position of the second rental vehicle 110b at the vehicle rental garage. In some examples, the location determining system 220 may communicate with and receive from the second rental vehicle 110b the location/position of the second rental vehicle 110b. In some examples, the location determining system 220 may communicate with and receive from the vehicle rental system 102 the location/position of the second rental vehicle 110b.

Additionally, the verification system 112 may include or be operably coupled with a display 222 (interchangeably referred to herein as a screen) for displaying an indication such as a message on whether the first rental vehicle 110a or the second rental vehicle 110b is the correct/incorrect rental vehicle and/or information on a location of a correct rental vehicle. In some examples, the display 222 may include a liquid crystal display (LCD) and/or variants thereof, plasma display, etc., and/or may be part of a touchscreen display. In some examples, the display 222 may be configured to accept inputs from a user regarding selections or preferences of the user via a graphical user interface (GUI).

The verification system 112 may also include or be operably coupled with one or more output devices 224 including a horn, light, or one or more components configured to alert a user of a location of the rental vehicle 110.

In some examples, the various components of the verification system 112 may be operably coupled to one another via one or more busses 230 to facilitate communication among the components to perform functions described herein. Moreover, one or more of the components described for the verification system 112 may be part of another system. For example, one or more of the processors 212, the memory 214, the communications system 216, the input devices 218, the location determining system 220, the display 222, or the output devices 224 may be part of one or more of an infotainment system, a navigation system, or safety system of the rental vehicle 110.

Figure 3:
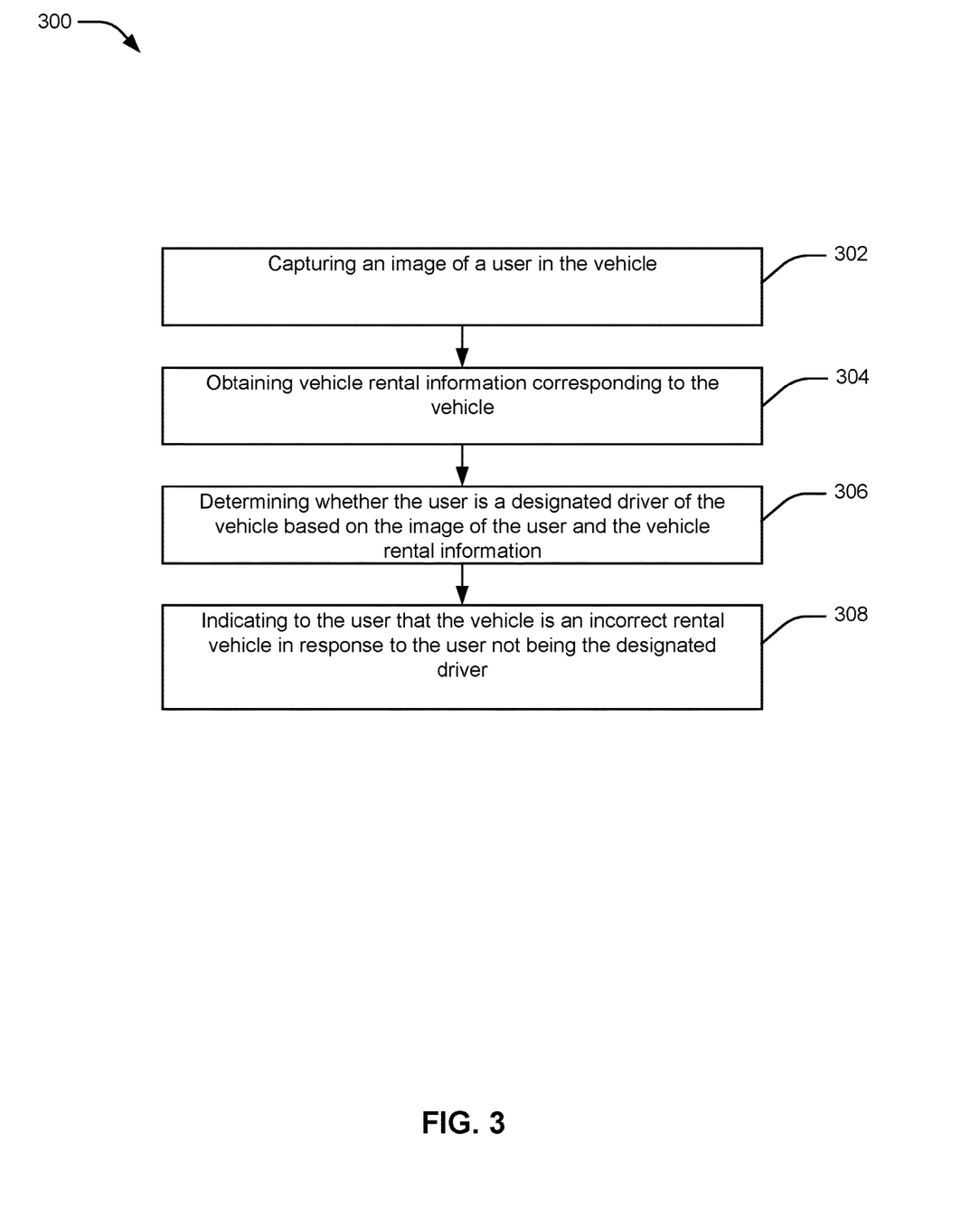
FIG. 3 illustrates a flowchart of an example method for rental vehicle driver verification, according to aspects of the disclosure.

Referring to FIG. 3, a method 300 for rental vehicle driver verification by a vehicle is depicted. In an example, the method 300 may be performed by the any one of the plurality of rental vehicles 110 of FIGS. 1 and 2 having the verification system 112. The following examples describe the method 300 corresponding to the first rental vehicle 110a. At block 302, the method 300 may include capturing an image of a user in the vehicle. For example, the input devices 218 may include a camera to capture an image of a user in the first rental vehicle 110a.

At block 304, the method 300 may include obtaining vehicle rental information corresponding to the vehicle. For example, the processor 212 may obtain the vehicle rental information corresponding to the first rental vehicle 110a. In an example, the processor 212 may receive the vehicle rental information from the vehicle rental system 102 in response to confirmed reservation by the user. In another example, the processor 212 may request the vehicle rental information in response to the image of the user being captured.

At block 306, the method 300 may include determining whether the user is a designated driver of the vehicle based on the image of the user and the vehicle rental information. For example, the processor 212 may determine whether the user is a designated driver of the first rental vehicle 110a based on the image of the user and the vehicle rental information. In some examples, the processor 212 may obtain profile information (e.g., name, address, and/or other information) of the user based on the image of the user, compare the profile information with the vehicle rental information (e.g., name, address and/or other information of the designated driver), and determine the user is not the designated driver of the vehicle in response to the profile information not matching the vehicle rental information. In some examples, the processor 212 may compare the image of the user with the image of the designated driver, as included in the vehicle rental information, for example, and determine that the user is not the designated driver of the vehicle in response to the image of the user not matching the image of the designated driver.

At block 308, the method 300 may include indicating to the user that the vehicle is an incorrect rental vehicle in response to determining that the user is not the designated driver. For example, the processor 212 may indicate to the user that the first rental vehicle 110a is an incorrect rental vehicle in response to determining that the user is not the designated driver. In some examples, the processor 212 may cause the display 222 to display a message regarding the first rental vehicle 110a being the incorrect rental vehicle and/or the second rental vehicle 110b being the correct rental vehicle. In some examples, the processor 212 may determine a correct rental vehicle (e.g., second rental vehicle 110b) corresponding to the user based on the image of the user and/or other information, for example, and indicate and/or display to the user a location/position of the correct rental vehicle. In some examples, the processor 212 may determine the correct rental vehicle (e.g., second rental vehicle 110b) and transmit instructions to the correct rental vehicle, wherein the instructions instruct the correct rental vehicle to identify its location via honking a horn or flashing lights, for example.

Figure 4:
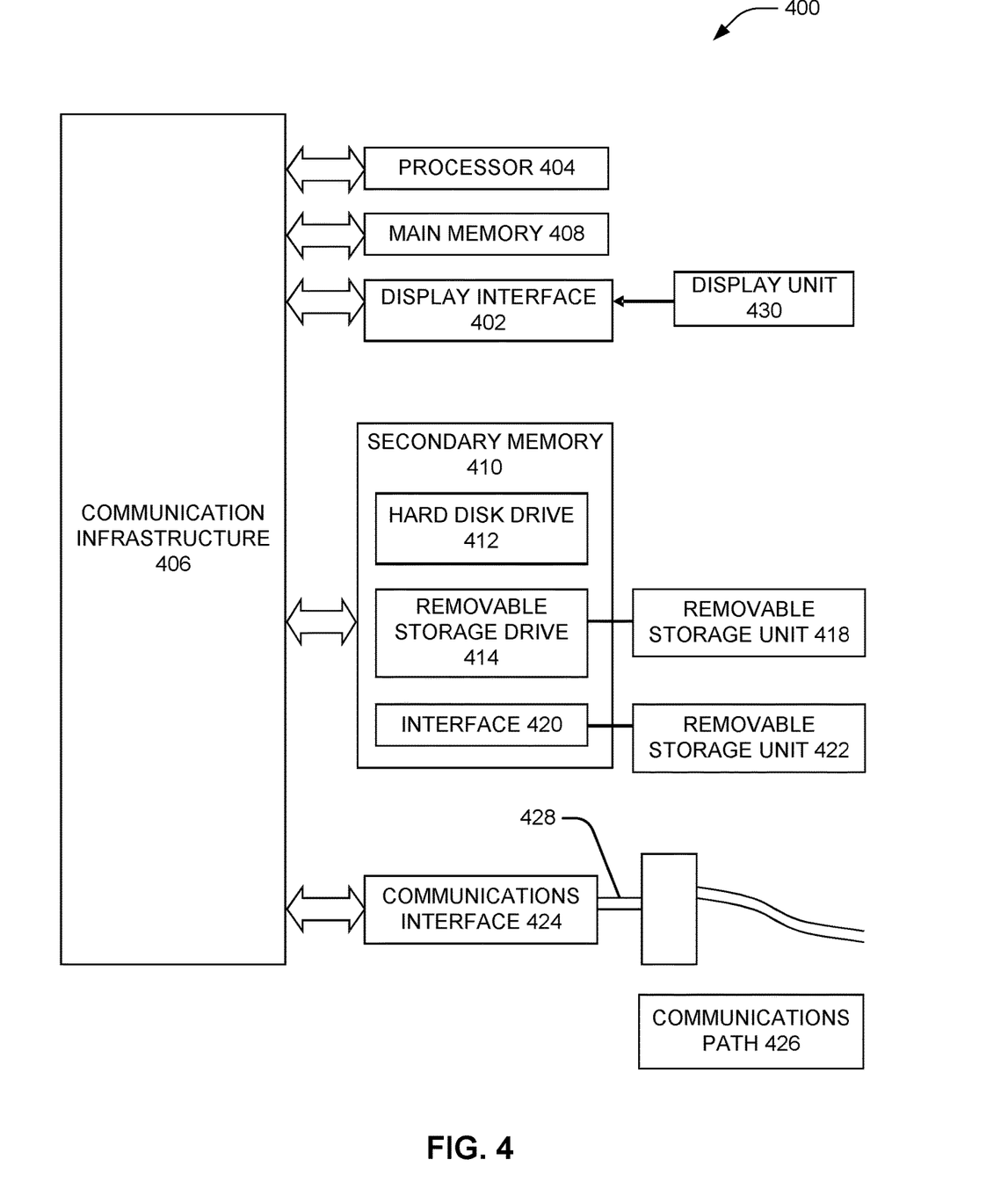
FIG. 4 illustrates a system diagram of an example of various hardware components and other features for rental vehicle driver verification, according to aspects of the disclosure.

Referring to FIG. 4, an example system for rental vehicle driver verification is depicted with a diagram of various hardware components and other features, for use in accordance with an aspect of the present disclosure. Aspects of the present disclosure may be implemented using hardware, software, or a combination thereof and may be implemented in one or more computer systems or other processing systems. In one example variation, aspects described herein may be directed toward one or more computer systems capable of carrying out the functionality described herein. An example of such a computer system 400 is shown in FIG. 4.

The computer system 400 may include one or more processors, such as processor 404. The processor 404 is connected to a communication infrastructure 406 (e.g., a communications bus, cross-over bar, or network). The processor 404 may be an example of the processor 212. Various software aspects are described in terms of this example computer system 400. After reading this description, it will become apparent to a person skilled in the relevant art(s) how to implement aspects described herein using other computer systems and/or architectures.

The computer system 400 may include a display interface 402 that forwards graphics, text, and other data from the communication infrastructure 406 (or from a frame buffer not shown) for display on a display unit 430. The display unit 430 may be an example of the display 222. The computer system 400 may also include a main memory 408, e.g., random access memory (RAM), and may also include a secondary memory 410. The secondary memory 410 may include, e.g., a hard disk drive 412 and/or a removable storage drive 414, representing a floppy disk drive, a magnetic tape drive, an optical disk drive, etc. The removable storage drive 414 may read from and/or write to a removable storage unit 418 in a well-known manner. The removable storage unit 418, represents a floppy disk, magnetic tape, optical disk, etc., which is read by and written to the removable storage drive 414. As will be appreciated, the removable storage unit 418 may include a computer usable storage medium having stored therein computer software and/or data.

In alternative aspects, the secondary memory 410 may include other similar devices for allowing computer programs or other instructions to be loaded into the computer system 400. Such devices may include, e.g., a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to the computer system 400. The memory 214 may include one or more of the main memory 408, the secondary memory 410, the removable storage drive 414, the removable storage unit 418, or the removable storage unit 422.

The computer system 400 may also include a communications interface 424. The communications interface 424 may allow software and data to be transferred between the computer system 400 and external devices. Examples of the communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by the communications interface 424. These signals 428 are provided to the communications interface 424 via a communications path (e.g., channel) 426. This path 426 carries signals 428 and may be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals 428. These computer program products provide software to the computer system 400. Aspects described herein may be directed to such computer program products. In an example, the communications system 216 may include the communications interface 424.

Computer programs (also referred to as computer control logic) may be stored in the main memory 408 and/or the secondary memory 410. The computer programs may also be received via the communications interface 424. Such computer programs, when executed, enable the computer system 400 to perform various features in accordance with aspects described herein. In particular, the computer programs, when executed, enable the processor 404 to perform such features. Accordingly, such computer programs represent controllers of the computer system 400. The computer programs may include instructions or code for executing methods for rental vehicle driver verification, as described herein.

In variations where aspects described herein are implemented using software, the software may be stored in a computer program product and loaded into the computer system 400 using the removable storage drive 414, the hard disk drive 412, or the communications interface 420. The control logic (software), when executed by the processor 404, causes the processor 404 to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 5:
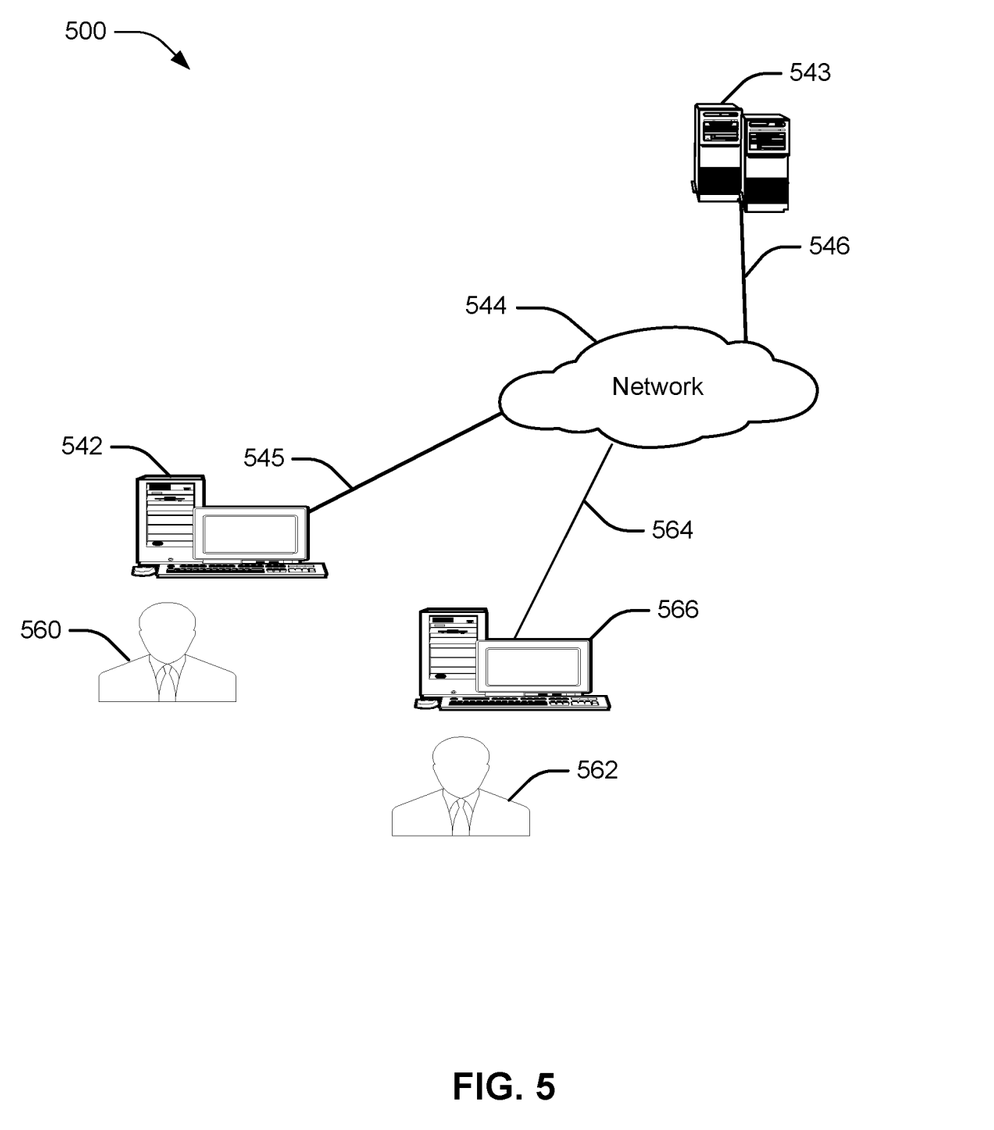
FIG. 5 illustrates a block diagram of an example of various system components for rental vehicle driver verification, according to aspects of the disclosure.

FIG. 5 is a block diagram of various example system components. FIG. 5 shows a communication system 500 including one or more accessors 560, 562 (also referred to interchangeably herein as one or more "users") and one or more terminals 542, 566. The terminals 542, 566 may include the rental vehicles 110 or a related system (e.g., verification system 112, communications system 216, location determining system 220), and/or the like. In one aspect, data for use in accordance with aspects described herein may be input and/or accessed by the accessors 560, 562 via the terminals 542, 566, such as personal computers (PCs), minicomputers, mainframe computers, microcomputers, telephonic devices, or wireless devices, such as personal digital assistants ("PDAs") or a hand-held wireless devices coupled to a server 543, such as a PC, minicomputer, mainframe computer, microcomputer, or other device having a processor and a repository for data and/or connection to a repository for data, via, a network 544 for instance, such as the Internet or an intranet, and couplings 545, 546, 564. The couplings 545, 546, 564 may include wired, wireless, or fiberoptic links. In another example variation, the method and system in accordance with aspects described herein operate in a stand-alone environment, such as on a single terminal.

The aspects discussed herein may also be described and implemented in the context of computer-readable storage medium storing computer-executable instructions. Computer-readable storage media includes computer storage media and communication media, and may be, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A vehicle configured for rental vehicle driver verification, comprising:
   a camera configured to capture an image of a user in the vehicle;
   a memory storing instructions; and
   a processor coupled with the camera and the memory and configured to execute the instructions to:
   receive the image of the user from the camera;
   obtain, from a vehicle rental system, vehicle rental information corresponding to the vehicle, the vehicle rental information including rental reservations scheduled for the vehicle;
   determine whether the user is a designated driver of the vehicle based on the image of the user and the vehicle rental information;
   indicate to the user that the vehicle is an incorrect rental vehicle in response to determining that the user is not the designated driver;
   determine a correct rental vehicle corresponding to the user based on the image of the user; and
   cause display of a first message on a vehicle display of the vehicle to indicate a location of the correct rental vehicle in response to determining the correct rental vehicle.

2. The vehicle of claim 1, wherein the processor is further configured to execute the instructions to:
   obtain profile information of the user based on the image of the user;
   compare the profile information with the vehicle rental information; and
   determine the user is not the designated driver of the vehicle when the profile information does not match the vehicle rental information.

3. The vehicle of claim 1, wherein the vehicle rental information includes an image of the designated driver of the vehicle, and wherein the processor is further configured to execute the instructions to:
   compare the image of the user with the image of the designated driver; and
   determine the user is not the designated driver of the vehicle when the image of the user does not match the image of the designated driver.

4. The vehicle of claim 1, wherein the processor is further configured to execute the instructions to:
   cause display of a second message by the vehicle display to indicate to the user that the vehicle is the incorrect rental vehicle.

5. The vehicle of claim 1, wherein the processor is further configured to:
   cause location instructions to be transmitted to the correct rental vehicle in response to determining the correct rental vehicle, wherein the location instructions instruct the correct rental vehicle to indicate the location of the correct rental vehicle.

6. The vehicle of claim 5, wherein the location instructions to indicate the location of the correct rental vehicle include honking a horn or flashing a light of the correct rental vehicle.

7. A method for rental vehicle driver verification by a vehicle, comprising:
   capturing an image of a user in the vehicle;
   obtaining, from a vehicle rental system, vehicle rental information corresponding to the vehicle, the vehicle rental information including rental reservations scheduled for the vehicle;
   determining whether the user is a designated driver of the vehicle based on the image of the user and the vehicle rental information;
   indicating to the user that the vehicle is an incorrect rental vehicle in response to determining that the user is not the designated driver;
   determining a correct rental vehicle corresponding to the user based on the image of the user; and
   displaying a first message on a vehicle display of the vehicle to indicate a location of the correct rental vehicle in response to determining the correct rental vehicle.

8. The method of claim 7, wherein the determining whether the user is the designated driver of the vehicle comprises:
   obtaining profile information of the user based on the image of the user;
   comparing the profile information with the vehicle rental information; and
   determining the user is not the designated driver of the vehicle when the profile information does not match the vehicle rental information.

9. The method of claim 7, wherein the vehicle rental information includes an image of the designated driver of the vehicle, and wherein the determining whether the user is the designated driver of the vehicle comprises:
   comparing the image of the user with the image of the designated driver; and
   determining the user is not the designated driver of the vehicle when the image of the user does not match the image of the designated driver.

10. The method of claim 7, wherein the indicating to the user that the vehicle is the incorrect rental vehicle comprises:
    displaying a second message on the vehicle display.

11. The method of claim 7, wherein the indicating to the user that the vehicle is the incorrect rental vehicle comprises:

transmitting location instructions to the correct rental vehicle in response to determining the correct rental vehicle, wherein the location instructions instruct the correct rental vehicle to indicate the location of the correct rental vehicle.

12. The method of claim 11, wherein the location instructions to indicate the location of the correct rental vehicle include honking a horn or flashing a light of the correct rental vehicle.

13. A non-transitory computer-readable medium storing executable code for rental vehicle driver verification of a vehicle, comprising code to:

capture an image of a user in the vehicle;

obtain, from a vehicle rental system, vehicle rental information corresponding to the vehicle, the vehicle rental information including rental reservations scheduled for the vehicle;

determine whether the user is a designated driver of the vehicle based on the image of the user and the vehicle rental information;

indicate to the user that the vehicle is an incorrect rental vehicle in response to determining that the user is not the designated driver;

determine a correct rental vehicle corresponding to the user based on the image of the user; and cause location instructions to be transmitted to the correct rental vehicle, wherein the location instructions instruct the correct rental vehicle to honk a horn or flash a light to indicate a location of the correct rental vehicle.

14. The non-transitory computer-readable medium of claim 13, further comprising code to:

display a message on a vehicle display of the vehicle to indicate to the user that the vehicle is the incorrect rental vehicle.

* * * * *